US012809349B2

(12) United States Patent
Lee

(10) Patent No.: US 12,809,349 B2
(45) Date of Patent: Nov. 24, 2026

(54) CONTROL SYSTEM AND PROGRAMMABLE LOGIC CONTROLLER THAT STORES A COUNT VALUE OF A SYNCHRONOUS COUNTER

(71) Applicant: Mitsubishi Electric Corporation, Tokyo (JP)

(72) Inventor: Weihau Lee, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 318 days.

(21) Appl. No.: 18/574,330

(22) PCT Filed: Jul. 19, 2021

(86) PCT No.: PCT/JP2021/026926
§ 371 (c)(1),
(2) Date: Dec. 27, 2023

(87) PCT Pub. No.: WO2023/002523
PCT Pub. Date: Jan. 26, 2023

(65) Prior Publication Data

US 2024/0241502 A1 Jul. 18, 2024

(51) Int. Cl.
*G05B 19/418* (2006.01)

(52) U.S. Cl.
CPC .................. *G05B 19/41815* (2013.01); *G05B 2219/13063* (2013.01); *G05B 2219/25474* (2013.01); *G05B 2219/36412* (2013.01)

(58) Field of Classification Search
CPC .... G05B 19/41815; G05B 2219/13063; G05B 2219/25474; G05B 2219/36412; G05B 19/05
See application file for complete search history.

(56) References Cited

U.S. PATENT DOCUMENTS

2015/0213838 A1* 7/2015 Dinev .................. G11B 27/031 386/224
2017/0134619 A1* 5/2017 Narayanswamy ..... H04N 23/90
(Continued)

FOREIGN PATENT DOCUMENTS

JP 2005286453 A 10/2005
JP 2020-102130 A 7/2020
(Continued)

OTHER PUBLICATIONS

IEEE-1588 outreach subcommittee, "IEEE 1588-2019 Evolves to Better Serve its Wide Variety of Applications", 2020, Internet URL: <https://sagroups.ieee.org/1588/news/IEEE-1588-2019-evolves-to-better-serve-its-wide-variety-of-applications/> (Year: 2020).*
(Continued)

*Primary Examiner* — Jonathan Michael Skrzycki
(74) *Attorney, Agent, or Firm* — XSENSUS LLP

(57) ABSTRACT

A control system includes a camera including a first synchronous counter, a PLC including a second synchronous counter, and a control network connecting the camera and the PLC. The control network repeatedly synchronizes the first synchronous counter and the second synchronous counter with high precision by measuring durations of a plurality of transmission delays between the camera and the PLC. The camera adds, to a captured image obtained by image capturing, a count value of the first synchronous counter at the image capturing, and transmits the captured image to the PLC through the control network. The PLC stores, into a storage device included in the PLC, a count value of the second synchronous counter, internal data or data of a connected control target, the count value from the first synchronous counter, and image data.

7 Claims, 11 Drawing Sheets

(56) References Cited

U.S. PATENT DOCUMENTS

| | | | | |
|---|---|---|---|---|
| 2019/0171192 | A1* | 6/2019 | Nishiyama | G06F 1/12 |
| 2020/0259998 | A1 | 8/2020 | Tsujikawa | |
| 2021/0364996 | A1* | 11/2021 | Miyasaka | G06T 7/0006 |

FOREIGN PATENT DOCUMENTS

| | | | |
|---|---|---|---|
| JP | 2020-134985 | A | 8/2020 |
| JP | 2020191141 | A | 11/2020 |
| WO | 2022/259379 | A1 | 12/2022 |

OTHER PUBLICATIONS

International Search Report and Written Opinion mailed on Oct. 19, 2021, received for PCT Application PCT/JP2021/026926, filed on Jul. 19, 2021, 8 pages including English Translation.
Office Action dated Mar. 24, 2026, issued for the corresponding CN patent application No. 202180100096.7 and the English translation, 18pp.

* cited by examiner

CONTROL SYSTEM AND PROGRAMMABLE LOGIC CONTROLLER THAT STORES A COUNT VALUE OF A SYNCHRONOUS COUNTER

CROSS-REFERENCE TO RELATED APPLICATION

This application is based on PCT filing PCT/JP2021/026926, filed Jul. 19, 2021, the entire contents of which are incorporated herein by reference.

TECHNICAL FIELD

The present disclosure relates to a control system and a programmable logic controller.

BACKGROUND ART

In the field of factory automation (FA), logs recorded by a programmable logic controller (PLC) and moving images of a production facility captured by an imaging device may be used to identify the cause of a trouble at the production facility. For example, when a production facility operates abnormally, a moving image of the abnormal operation is compared with the log acquired at the time added to the moving image to identify the cause of the abnormal operation. The time added to the moving image may be, for example, the time at which each frame of the moving image is captured by an imaging device or the time at which data of each frame of the moving image is acquired by the PLC.

Any inconsistency between the time added to the moving image and the log record time can cause difficulty in identifying the cause. Techniques for matching the time added to the moving image with the log record time are thus awaited.

Patent Literature 1 describes a technique for a high-precision synchronization of the time added to the moving image with the log record time by connecting an imaging device (camera) with a PLC with a dedicated low-delay imaging trigger line. The technique described in Patent Literature 1 can match the time added to the moving image with the log record time.

CITATION LIST

Patent Literature

Patent Literature 1: Unexamined Japanese Patent Application Publication No. 2020-134985

SUMMARY OF INVENTION

Technical Problem

The technique described in Patent Literature 1 uses the dedicated low-delay imaging trigger line to connect the camera and the PLC. The technique thus does not allow use of widespread cameras such as network cameras or webcams and uses a dedicated imaging device compatible with the imaging trigger line. In addition, the use of the dedicated low-delay imaging trigger line limits remote monitoring.

In view of the above circumstances, an objective of the present disclosure is to enable matching of the time added to a moving image with the record time of a log recorded by a PLC without connecting a camera and the PLC with a dedicated low-delay imaging trigger line.

Solution to Problem

To achieve the above objective, a control system according to the present disclosure includes a camera including a first synchronous counter, a programmable logic controller including a second synchronous counter, and a control network connecting the camera and the programmable logic controller. The control network guarantees a duration of a communication delay to be within a longest communication delay duration, and periodically and repeatedly synchronizes the first synchronous counter and the second synchronous counter with high precision by measuring durations of a plurality of transmission delays between the camera and the programmable logic controller. The camera adds, to a captured image obtained by image capturing, a count value of the first synchronous counter at the image capturing, and transmits the captured image to the programmable logic controller through the control network. The programmable logic controller stores, into a storage device included in the programmable logic controller, a count value of the second synchronous counter, internal data or data of a connected control target, the count value of the first synchronous counter, and the captured image.

Advantageous Effects of Invention

The present disclosure enables matching of the time added to a moving image with the record time of a log recorded by a PLC without connecting a camera and the PLC with a dedicated low-delay imaging trigger line.

DESCRIPTION OF EMBODIMENTS

Figure 1:
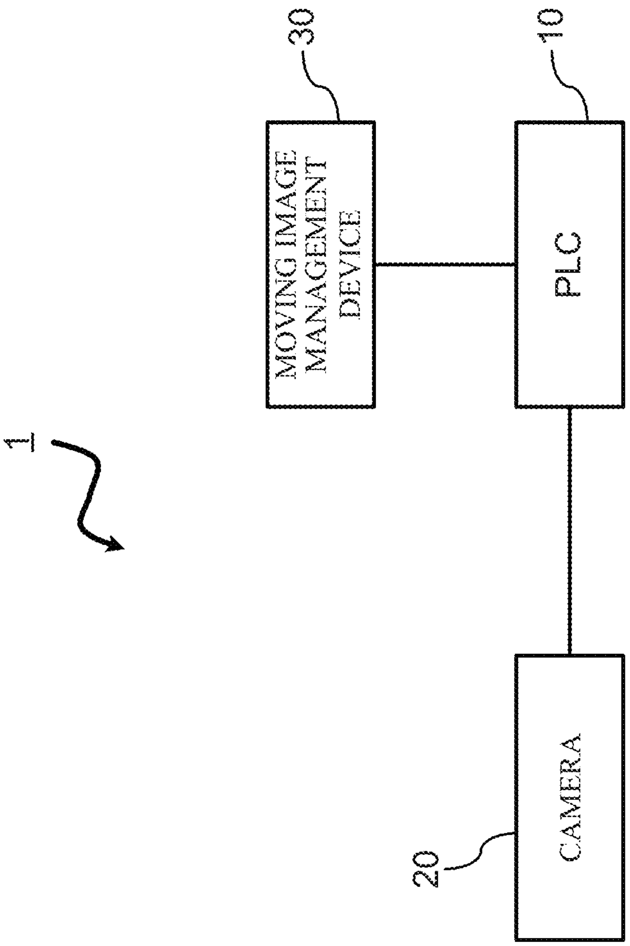
FIG. 1 illustrates overall configuration of a control system according to an embodiment of the present disclosure.

A control system according to an embodiment of the present disclosure is described with reference to the drawings. In the drawings, the same or equivalent components are assigned the same reference sign.

A control system 1 illustrated in FIG. 1 is installed at, for example, a production site including a production facility. The control system 1 includes a programmable logic controller (PLC) 10, a camera 20, and a moving image management device 30. As described later, the control system 1 can match the time added to a moving image of the production facility captured by the camera 20 with the record time of a log recorded by the PLC 10.

The PLC 10 and devices as control targets controlled by the PLC 10 are connected with a control network in an industrial network. In the industrial network, factory automation (FA) devices to be controlled in real time are connected and controlled through Ethernet (registered trademark). Industrial networks using Ethernet include CC-Link IE Field (registered trademark) and CC-Link IE TSN (registered trademark).

The PLC 10 and the moving image management device 30 are connected with an Ethernet communication cable for communication with each other. Similarly, the PLC 10 and the camera 20 are connected with an Ethernet communication cable for communication with each other and also to the control network.

The camera 20 continuously captures images of a production facility at regular intervals. The camera 20 transmits moving image data indicating the moving image acquired by continuously capturing images of the production facility to the PLC 10. Although FIG. 1 simply illustrates one camera 20, the control system 1 may include multiple cameras 20.

The PLC 10 being a programmable logic controller is connected to components such as a sensor and an actuator (not illustrated) other than the camera 20 and the moving image management device 30. The PLC 10 acquires moving image data indicating the moving image captured by the camera 20 from the camera 20. As described later, the PLC 10 records a log of the operation of the PLC 10. The PLC 10 also stores the acquired moving image data as described later.

The moving image management device 30 reads the log recorded by the PLC 10 and the moving image data stored by the PLC 10 and reproduces the log and the moving image in an interrelated manner. Reproduction in an interrelated manner refers to displaying, while a moving image is being reproduced, the log at the time corresponding to the moving image being reproduced together with the moving image. This interrelated reproduction allows, for example, the user to learn, through viewing the moving image reproduced in an interrelated manner, the state of the production facility at the time at which abnormal data is recorded in the log. When the user identifies an abnormality in the production facility through viewing the moving image, the user can view the log reproduced in an interrelated manner to examine the data recorded in the log at the time the abnormality occurs.

Inconsistency in the moving image to be avoided in the control system 1 is described with reference to FIG. 2.

The timeline for image capturing is first described. The timeline for image capturing indicates that the camera 20 captures images of the production facility at regular intervals to acquire sequential images. Each vertical tick line on the time axis indicates one captured image, or more specifically, one frame in the moving image. In the timeline for image capturing, the vertical tick lines are at regular intervals and indicate that the frames of the moving image are acquired at regular intervals. Upon acquiring each frame, the camera 20 transmits image data indicating the frame to the PLC 10.

The frames acquired at regular intervals by the camera 20 during image capturing may not be received by the PLC 10 at regular intervals due to jitter. Additionally, the camera 20 includes a clock different from the clock included in the PLC 10, causing a clock difference. Thus, the time interval between frames during image capturing by the camera 20 may differ from the time interval between frames at the reception by the PLC 10. The camera 20 and the PLC 10 are connected with a general-purpose communication cable, and thus cause latency as well in transmission of each frame.

The time at which the camera 20 captures each frame thus typically differs from the time at which the PLC 10 receives image data indicating the frame. Thus, the moving image associated with the log based on the time at which the PLC 10 receives each frame actually has inconsistency between the time associated with each frame and the time associated with the log. In the example below, the clock difference, jitter, and latency that can cause inconsistency are described in detail.

The clock difference is first described. The timeline for the clock difference in FIG. 2 indicates the frame intervals at the reception by the PLC 10 when the clock difference alone occurs without jitter and latency. In the timeline for the clock difference, frame intervals are regular, but are different from the intervals in the image capturing due to the clock difference. For example, the timeline for the clock difference indicates that the time length corresponding to seven frames at the reception is longer than the time length corresponding to seven frames in the image capturing. Thus, the time at the reception and the time in the image capturing differ and can cause inconsistency when the moving image and the log are associated with each other.

Jitter is now described. The timeline for jitter in FIG. 2 indicates the frame intervals at the reception by the PLC 10 when jitter alone occurs without the clock difference and latency. As indicated by the timeline for jitter, the intervals between frames at the reception are irregular or fluctuate due to jitter. Thus, the time at the reception and the time in the image capturing differ and can cause inconsistency when the moving image and the log are associated with each other.

Latency is now described. The timeline for latency in FIG. 2 indicates the frame intervals at the reception by the PLC 10 when latency alone occurs without the clock difference and jitter. In the timeline for latency, the reception time of each frame lags behind the time in the image capturing although the frame intervals are regular and equal to the intervals in the image capturing. This lag or latency results from, for example, delay caused by a communication cable or a communication interface. Thus, the time at the reception and the time in the image capturing differ and can cause inconsistency when the moving image and the log are associated with each other. Latency caused by, for example, a communication cable or a communication interface is expected to be substantially regular.

Figure 2:
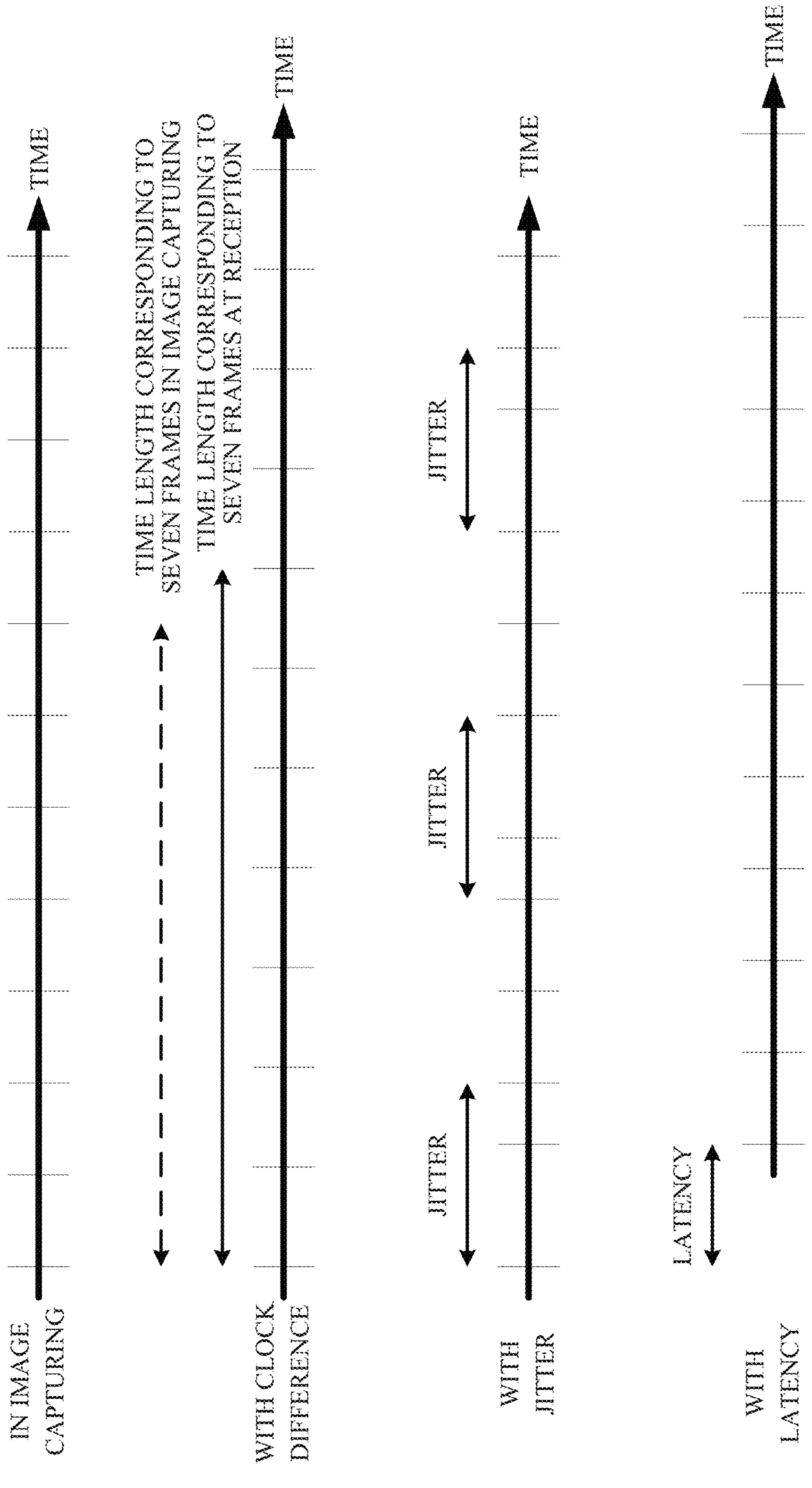
FIG. 2 is a diagram describing inconsistency in a moving image to be avoided in the control system according to the embodiment of the present disclosure.

Although one of the clock difference, jitter, or latency occurs in each timeline in FIG. 2, all of the clock difference, jitter, and latency occur typically. The inconsistency from these three causes is to be removed.

The PLC 10 is typically used for mechanical control. Mechanical control based on detection signals from sensors involves high responsiveness. The sensors include infrared sensors and magnetic sensors, and may also be camera systems. In contrast, control for machining often involves synchronous operation of actuators with multiple axes.

To maintain synchronization in control networks such as CC-Link IE Field and CC-Link IE TSN, hardware devices include a mechanism that achieves a particular level of punctuality and synchronizes the timing between the devices in microseconds by statistically measuring delays on transmission paths.

Such transmission path delays are measured using measurement values indicating transmission path delays from a master through slaves to achieve a high-precision synchronization.

Figure 3:
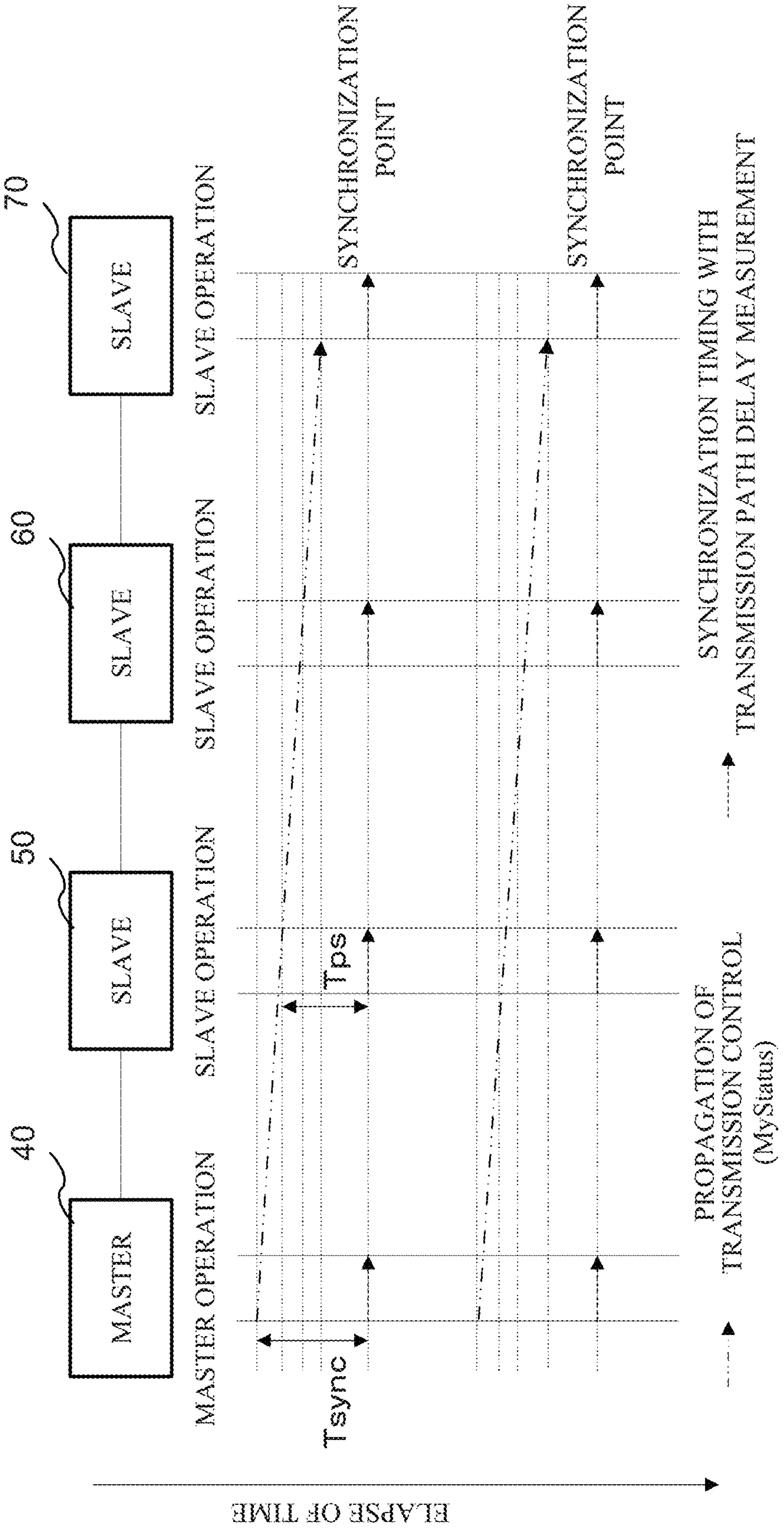
FIG. 3 illustrates a synchronization scheme using transmission path delay measurement in the embodiment of the present disclosure.

FIG. 3 illustrates a synchronization scheme using transmission path delay measurement. In the transmission path delay measurement, synchronization is performed at synchronization points. A transmission control (MyStatus) frame transmitted from a master 40 propagates with a delay over distance. The master 40 calculates the durations of transmission delays at slaves 50, 60, and 70 from a master time at which the master 40 receives response signals from the slaves 50, 60, and 70, and transmits the durations to the slaves 50, 60, and 70. The synchronization point is the time at which a certain period of time (Tsync) has elapsed after the master 40 transmits the transmission control (MyStatus) frame. Each of the slaves 50, 60, and 70 performs synchronization at the elapse of a time Tps (Tsync-delay duration) that is calculated by subtracting the calculated delay duration from the time at which the slave has received a transmission control (MyStatus) frame. The slaves 50, 60, and 70 thus perform synchronization at the same time.

As described above, the camera 20 can function as a sensor and thus is to be highly responsive, but is not to operate in synchronization, unlike actuators with multiple axes.

An image capturing operation performed by the camera 20 is to be controlled synchronously in the same manner as the actuators on the control network. The PLC 10 as an embedded controller includes an additional large storage to operate as a data collection device for collecting data including images.

More specifically, the PLC 10 typically handling control data alone performs the image acquiring process divided into image capturing instruction and image transmission and uses the synchronization function of the control network in each of the imaging instruction and the image transmission to associate remote image data and control data with each other and store such data.

Figure 4:
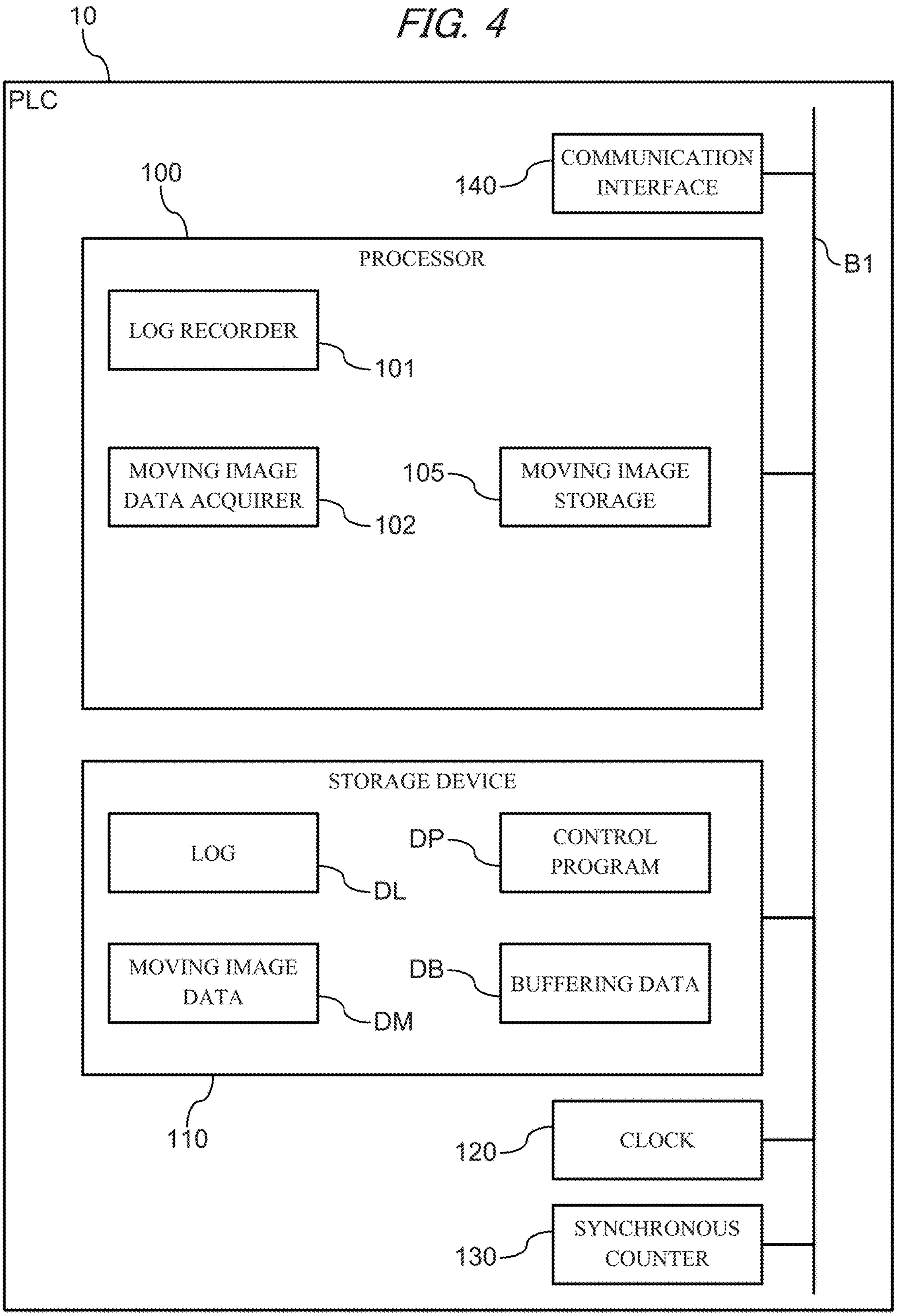
FIG. 4 illustrates configuration of a PLC according to the embodiment of the present disclosure.

The configuration of the PLC 10 is described with reference to FIG. 4. The PLC 10 includes a processor 100, a storage device 110, a clock 120, a synchronous counter 130, and a communication interface 140. The processor 100, the storage device 110, the clock 120, the synchronous counter 130, and the communication interface 140 are connected with a bus B1 to communicate with one another.

The processor 100 is, for example, a central processing unit (CPU). Each function of the processor 100 described later is implemented by the processor 100 reading and executing a control program DP stored in the storage device 110.

The storage device 110 includes, for example, a random-access memory (RAM), a hard disk drive (HDD), or a solid-state drive (SSD). The storage device 110 stores a log DL, moving image data DM, the control program DP, and buffering data DB. The log DL, the moving image data DM, and the buffering data DB are described later. The storage device 110 functions as a work memory when the processor 100 reads and executes the control program DP.

The clock 120 outputs clock signals for the processor 100, the storage device 110, and the communication interface 140 to operate.

The synchronous counter 130 indicates time by counting the clock signals generated by the clock 120. The synchronous counter 130 is an example of a second synchronous counter in an aspect of the present disclosure.

The communication interface 140 is a communication interface for a control network, such as CC-Link IE Field and CC-Link IE TSN. The communication interface 140 connected to the camera 20 and the moving image management device 30 allows the PLC 10 to communicate with the camera 20 and the moving image management device 30.

Each function implemented by the processor 100 reading and executing the control program DP is described. The processor 100 reads and executes the control program DP to implement functional components including a log recorder 101, a moving image data acquirer 102, and a moving image storage 105.

The log recorder 101 records, as the log DL in the storage device 110, the log of, for example, sensor data acquired from a sensor (not illustrated) or data indicating the internal state of the PLC 10. The log recorder 101 records the log together with the record time based on the clock signal from the clock 120.

The moving image data acquirer 102 acquires moving image data indicating a moving image captured by the camera 20 and stores the moving image data as buffering data DB into the storage device 110 to buffer the moving image data. The moving image data acquirer 102 also stores the reception time of each frame into the buffering data DB. The reception time of each frame is acquired based on the synchronous counter 130 counting the clock signals from the clock 120. The buffering data DB has an upper limit capacity. When the data size of the buffering data DB reaches the upper limit capacity, the oldest data is deleted. The buffering data DB has, for example, a ring buffer data structure. The buffering data DB has, for example, a data size to store a moving image of about 30 minutes long.

Upon generation of a trigger with the condition specified by setting information, the moving image storage 105 extracts, from the moving image data included in the buffering data DB, moving image data acquired around the time at which the trigger is generated and stores, into the storage device 110, as the moving image data DM, new moving image data including the frames to which the reception time is added. The trigger herein refers to a signal for instructing the moving image storage 105 to store the moving image. The trigger is generated when, for example, a log indicating an abnormality of the production facility is recorded in the log DL, since the moving image before and after the abnormality occurs in the production facility is highly likely to be used. The moving image storage 105 stores the moving image in response to the trigger. The time around the time at which the trigger is generated is, for example, within two minutes before and after the trigger generation.

Figure 5:
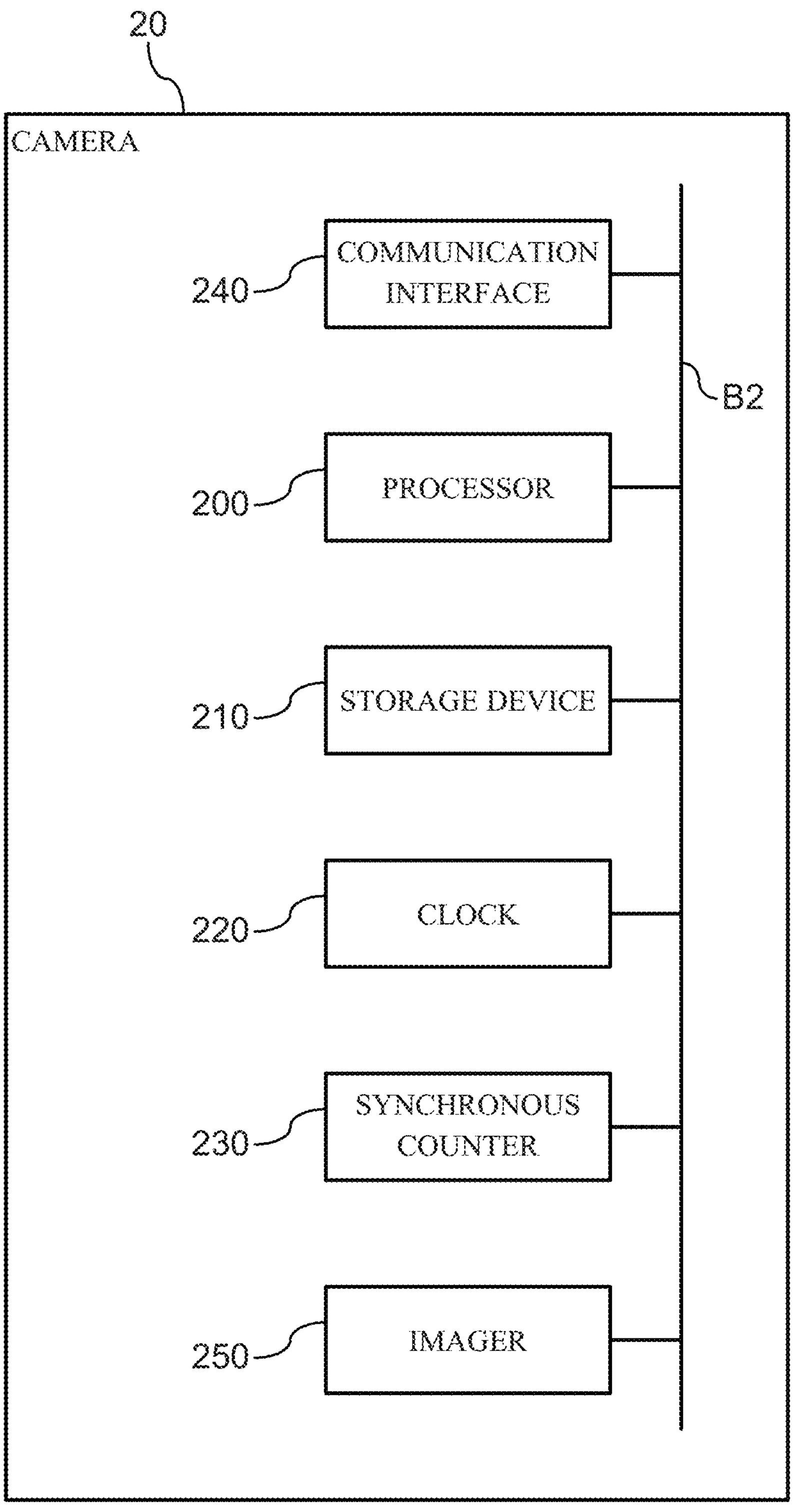
FIG. 5 illustrates configuration of a camera according to the embodiment of the present disclosure.

As illustrated in FIG. 5, the camera 20 includes a processor 200, a storage device 210, a clock 220, a synchronous counter 230, a communication interface 240, and an imager 250. The processor 200, the storage device 210, the clock 220, the communication interface 240, and the imager 250 are connected with a bus B2 to communicate with one another.

The processor 200 is, for example, a CPU. Each function is implemented by the processor 200 reading and executing the control program stored in the storage device 210. The storage device 210 includes, for example, a RAM or a read-only memory (ROM). The imager 250 captures an image of a production device.

The clock 220 outputs clock signals for the processor 200, the storage device 210, and the communication interface 240 to operate. The synchronous counter 230 indicates time by counting the clock signals generated by the clock 220. The synchronous counter 230 is an example of a first synchronous counter in an aspect of the present disclosure.

The communication interface 240 is a communication interface for a control network, such as CC-Link IE Field and CC-Link IE TSN. The communication interface 240 connected to the camera 20 and the moving image management device 30 allows the camera 20 to communicate with the PLC 10. The control network includes a mechanism to ensure and guarantee a duration of a delay in communication from a master to a slave to be within a longest communication delay duration, and periodically and repeatedly synchronizes the first and second synchronous counters with high precision by measuring the durations of multiple transmission delays between the camera 20 and the PLC 10.

Figure 6:
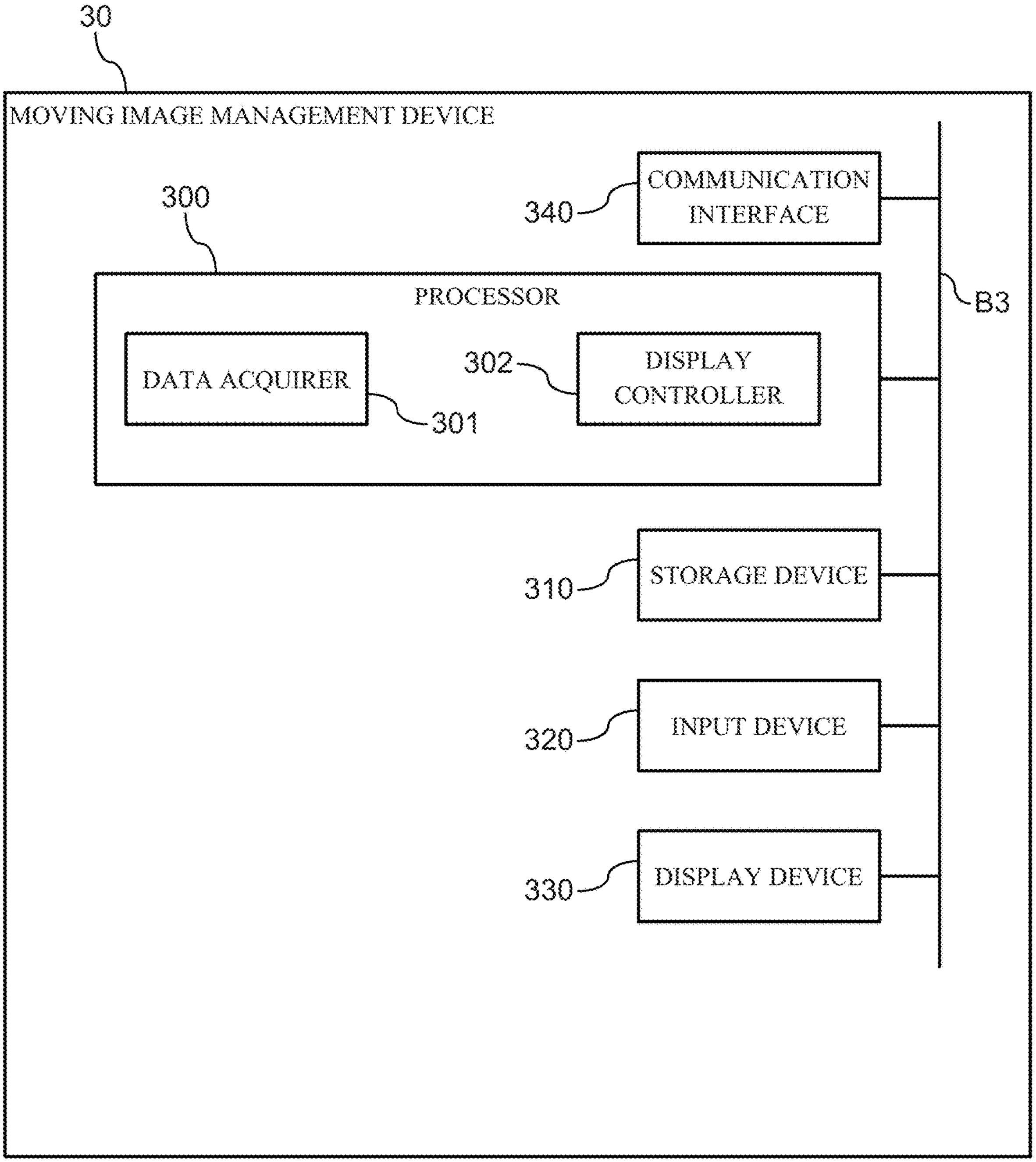
FIG. 6 illustrates configuration of a moving image management device according to the embodiment of the present disclosure.

The configuration of the moving image management device 30 is described with reference to FIG. 6. The moving image management device 30 includes a processor 300, a storage device 310, an input device 320, a display device 330, and a communication interface 340. The processor 300, the storage device 310, the input device 320, the display device 330, and the communication interface 340 are connected with a bus B3 to communicate with one another. The moving image management device 30 is a computer such as a personal computer or a smartphone.

The processor 300 is, for example, a CPU. Each function is implemented by the processor 300 reading and executing the control program stored in the storage device 310.

The storage device 310 includes, for example, a RAM, an HDD, or an SSD. The storage device 310 stores a control program executable by the processor 300. The control program is, for example, an engineering tool program provided by the manufacturer of the PLC 10. The storage device 310 serves as a work memory when the processor 300 reads and executes the control program.

The input device 320 outputs signals based on a user input. The input device 320 is, for example, a touchscreen integrated with the display device 330 described below. In some embodiments, the input device 320 may be an input device such as a keyboard or a mouse.

The display device 330 displays information to be provided to the user based on the control performed by a display controller 302. The display device 330 is, for example, a touchscreen integrated with the input device 320. In some embodiments, the display device 330 may be an independent display.

The communication interface 340 is, for example, a common communication interface such as a universal serial bus (USB) interface or a network interface. The communication interface 340 connected to the PLC 10 allows the moving image management device 30 to communicate with the PLC 10.

Each function is implemented by the processor 300 reading and executing the control program stored in the storage device 310. The processor 300 reads and executes the control program to implement functional components including a data acquirer 301 and the display controller 302.

The data acquirer 301 communicates with the PLC 10 through the communication interface 340 and acquires the moving image data DM and the log DL stored in the storage device 110 in the PLC 10.

The moving image management device 30 specifies, based on a user input, recorded logging data and the reproduction start point of moving image data to instruct the display controller 302 to display the logging data and the moving image data on the screen of the display device 330. The reproduction start point may be specified with the method below.

(1) The reproduction start point may be directly specified by inputting time through the input device 320.

(2) To record data and a moving image before or after an event indicating an abnormality of logging data, the reproduction start point may also be specified by selecting the event. For example, an event history or an alarm history may be displayed for a user selection in a table including an event occurrence time and the details of each event, such as excess temperature and speed decrease. This eliminates time-consuming timing matching between a moving image and data.

A process for collecting moving image data synchronized with control data using synchronization on the control network is described based on the three operations below:

(a) controlling image capturing timing,
(b) transmitting image capturing data, and
(c) identifying time of image capturing.

(a) Controlling Image Capturing Timing

Image capturing performed by the camera 20 that appears to be a sensor is handled as an action performed by an actuator and is controlled synchronously using synchronization on the control network to synchronize the timing with other control data. The PLC 10 uses the synchronization to control an image capturing timing for instruction to the camera 20 that is a timing at which image capturing by the camera 20 is to be performed.

Figure 7:
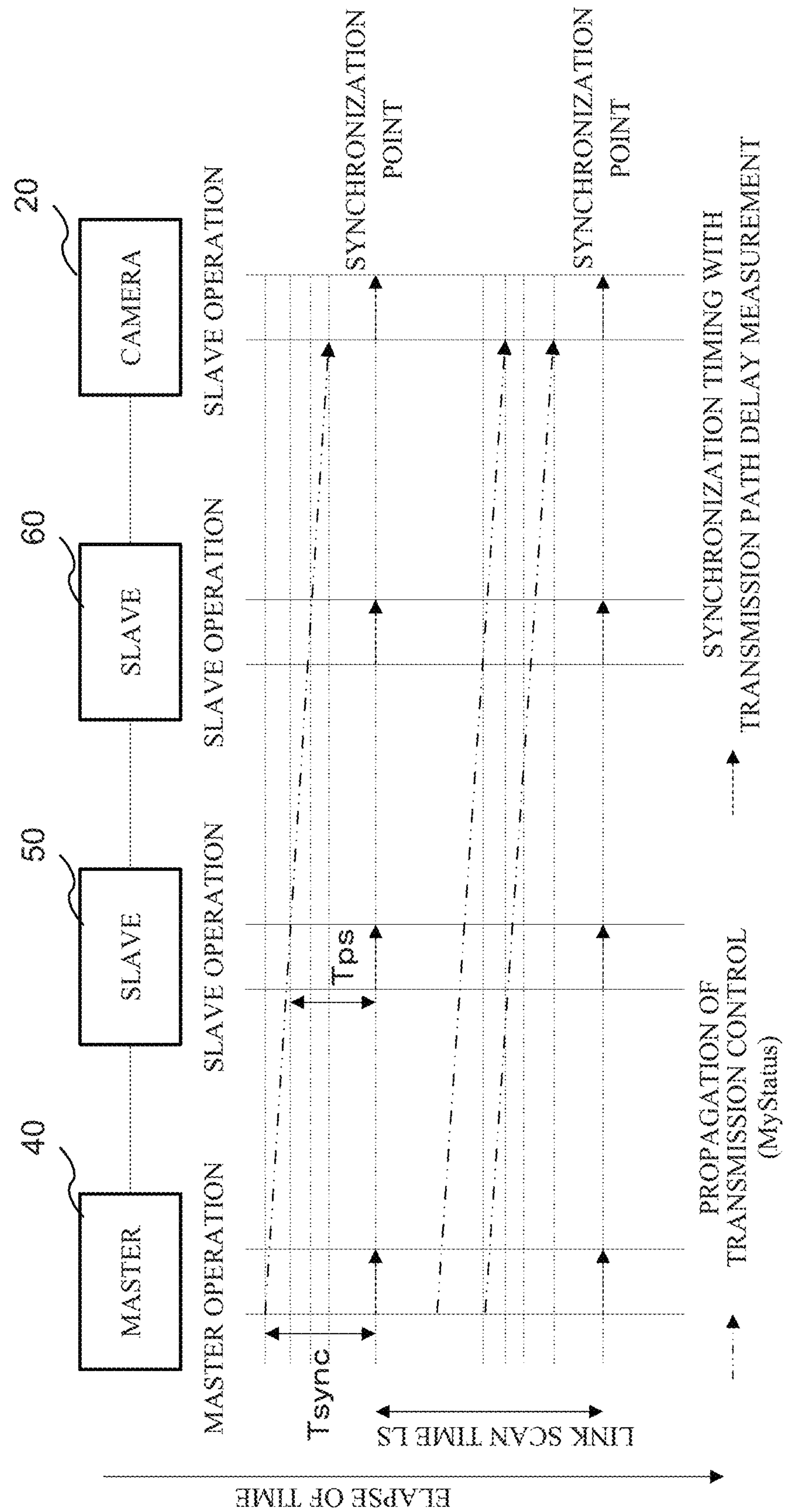
FIG. 7 illustrates image capturing timings according to the embodiment of the present disclosure.

FIG. 7 illustrates the image capturing timings for the slave 70 in FIG. 3 being used as the camera 20. The master 40 is the PLC 10. As illustrated in FIG. 7, the period of time to perform the overall sequence is constant and corresponds to one cycle referred to as a link scan. The PLC 10 may sends to the camera 20 an instruction of the image capturing timing along the link scan. As described above, however, delays on transmission paths can have varying durations depending on locations in the network, and cannot be easily associated with control data.

The synchronization is thus used without any change to allow the camera 20 to automatically determine the image capturing timing at each synchronization point of the network upon receiving an instruction from the PLC 10 or based on predetermined setting information specifying the number of synchronization points to be used as a trigger for image capturing. The PLC 10 monitors the duration of a delay at each synchronization point and can thus associate the image capturing timing with the control data with high precision. In this case, the minimum interval between instructions to capture images is the duration between synchronization points.

Figure 8:
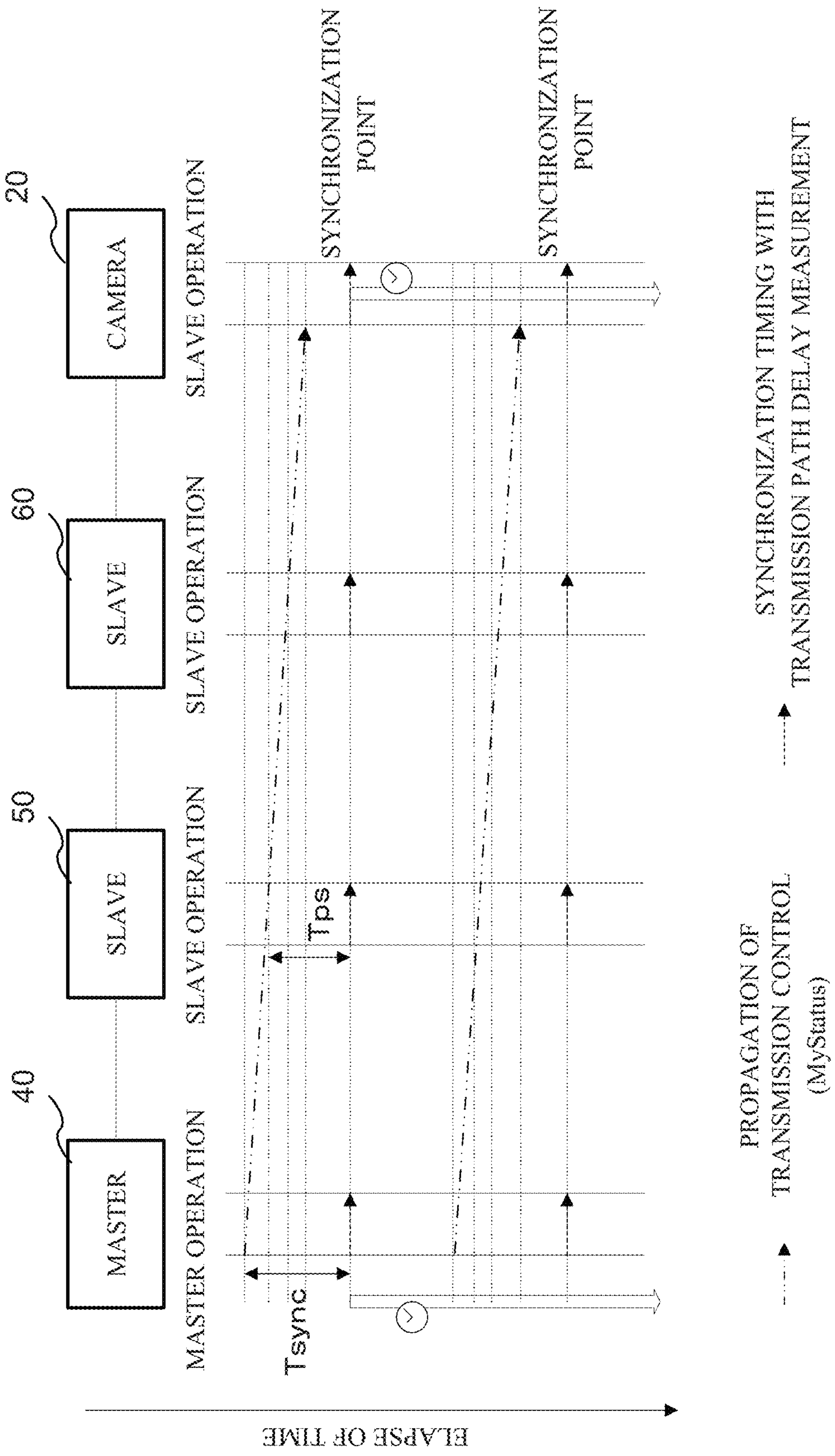
FIG. 8 illustrates another example of the image capturing timings according to the embodiment of the present disclosure.

FIG. 8 illustrates another example. The camera 20 automatically determines the image capturing timing based on setting information acquired from the PLC 10 or predetermined setting information using the counter information indicating the synchronization time to calculate a synchronization point. For example, image capturing may be scheduled based on any predetermined synchronous counter value that occurs after a communication delay guaranteed by the network. When the PLC 10 operates at a fixed period with the constant scan function for maintaining a constant scan time, image capturing may be repeatedly scheduled by specifying a start synchronous counter value that occurs after the communication delay and a repetitive counter cycle. The camera 20 may simply capture moving images at any predetermined timing based on a schedule, such as a fixed counter cycle of 60 Hz.

(b) Transmitting Image Capturing Data

Figure 9:
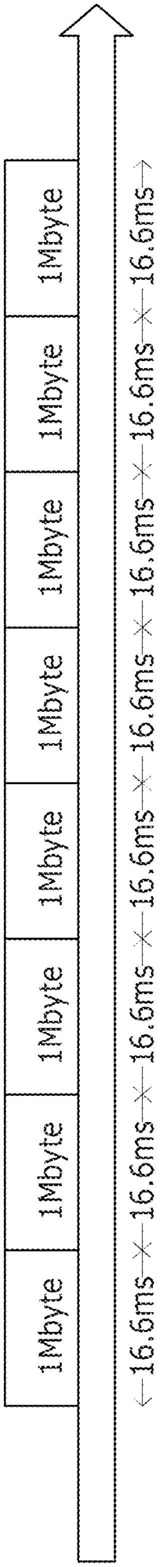
FIG. 9 illustrates a control data sequence on a control network according to the embodiment of the present disclosure.

The control network repeatedly transmits and receives small identical data at high speed to maintain punctual control as illustrated in FIG. 9. Moving image data is compressed before transmission to save the bandwidth. The size of moving image data is thus not constant for each frame. In particular, the size of a key frame can be large for a difference frame. The control network thus cannot directly undergo synchronization. In other words, moving image data may not be transmitted in one cycle, whereas typical control data may be transmitted in one cycle. A communication cycle determined based on the maximum size of the key frame can slow the cycle inappropriately for mechanical control.

Figure 10:
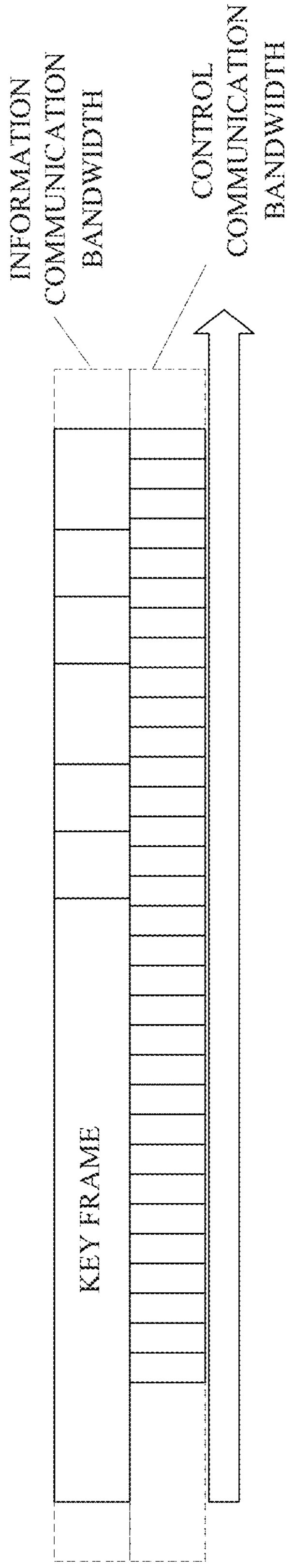
FIG. 10 illustrates time-sharing of a control communication bandwidth and an information communication band according to the embodiment of the present disclosure.

The control network, such as CC-Link IE Field and CC-Link IE TSN, has the control communication bandwidth and the information communication bandwidth time-shared as illustrated in FIG. 10. The information communication bandwidth is used to transmit moving image data. The control remains unaffected by transmitting images through the information communication bandwidth. However, with the bandwidths being shared, moving images may be compressed not to reduce the bandwidths. The control communication bandwidth is used to transmit data for a synchronization timing.

In some embodiments, the control network may be used for synchronization between the image capturing timing and the time or for transmission or reception of time information, whereas other communication lines may be used to transmit images. However, a communication line provided separately can inconvenience users by, for example, using dual communication lines with different methods.

(c) Identifying Time of Image Capturing

The time of image capturing performed by the camera 20 may be identified using the PLC 10 or added to the moving image data using the camera 20.

Identification by the PLC 10 may be adding the time of imaging by the PLC 10 through prediction of a delay or adding through transmission and receipt of the identification information at the time at which the PLC 10 has instructed the image capturing. When the camera 20 automatically determines the image capturing timing at each synchronization point of the network upon receiving an instruction from the PLC 10 or based on predetermined setting information specifying the number of synchronization points to be used as a trigger for capturing images, the PLC 10 may add the time at the following synchronization point.

The camera 20 may add the time of image capturing to moving image data by, for example, adding the real time in the UNIX (registered trademark) time format in nanoseconds to each frame of an image. In some embodiments, for example, a frame count value for the operating frequency of 90 KHz of the clock counter in the camera 20 may also be added in accordance with the specifications of the moving image format. In the case of adding a frame count value of 90 KHz, the time at which the counter is 0 is shared in advance between the camera 20 and the PLC 10. When the camera 20 automatically determines the image capturing timing based on setting information acquired from the PLC 10 or predetermined setting information using the counter information indicating the synchronization time to calculate a synchronization point, transmission with addition to image data is easier and more reliable.

Figure 11:
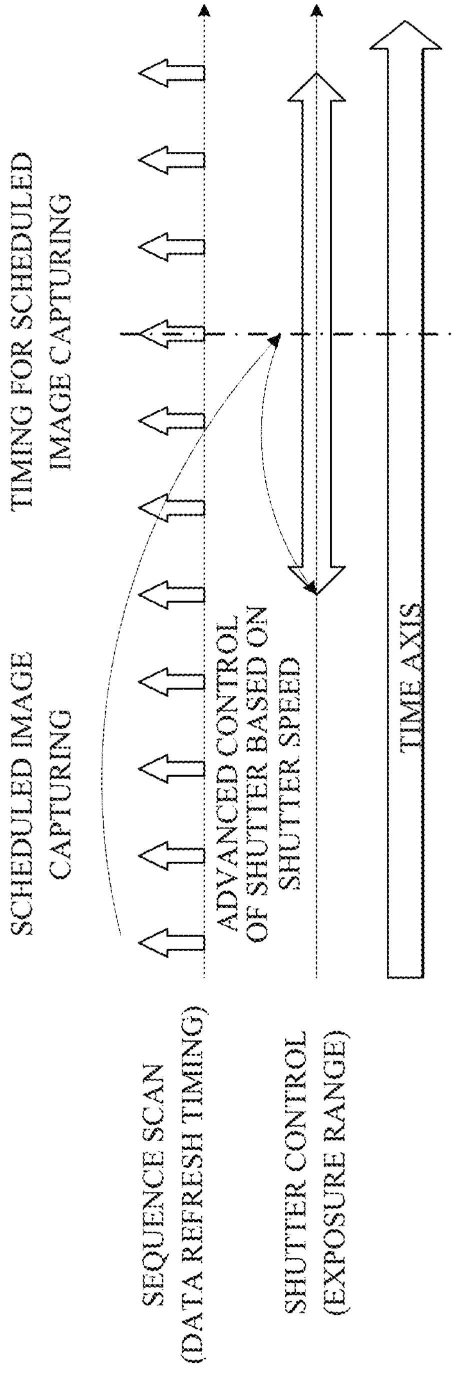
FIG. 11 illustrates timing control over a shutter of a camera in the embodiment of the present disclosure.

FIG. 11 illustrates the timing control for the shutter of the camera 20. When the camera 20 automatically determines the image capturing timing based on setting information acquired from the PLC 10 or predetermined setting information using the counter information indicating the synchronization time to calculate a synchronization point to control the image capturing timing, scheduling image capturing based on any synchronous counter value that occurs after a communication delay allows the camera 20 to control preceding image capturing within an allowance time as appropriate. To associate the timing with control data, an intermediate point of the exposure time may be used. A machine speed is often higher than the shutter speed. This can unavoidably cause blurring of images. Capturing an image with respect to an intermediate of the blurring allows more accurate analysis of the relationship between the control data and the event.

Since matching in the image capturing timing among the multiple cameras 20 can be controlled with high precision, pieces of image data recorded by the multiple cameras 20 may be associated with one another with high precision and may also be composited. For example, images captured by the multiple cameras 20 may be changed and composited into a natural 360° image without blind spots, thus reducing the workload for analyzing any trouble.

In the above embodiment, the moving image management device 30 includes the input device 320 and the display device 330, but the input device 320 and the display device 330 may be external devices.

Other Modifications

The programs used in the PLC 10 and the moving image management device 30 may be distributed on a non-transitory computer-readable recording medium such as a compact disc ROM (CD-ROM), a digital versatile disc (DVD), a USB flash drive, a memory card, or an HDD. Such programs may be installed on a dedicated programmable logic controller or a general-purpose computer to cause the controller or the computer to function as the PLC 10 or the moving image management device 30.

The programs may be stored in a storage device in another server on the Internet and may be downloaded from the server.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Control system
10 PLC
20 Camera
30 Moving image management device
40 Master
50, 60, 70 Slave
100 Processor

101 Log recorder
102 Moving image data acquirer
105 Moving image storage
106 Display controller
110 Storage device
120 Clock
130 Synchronous counter
140 Communication interface
200 Processor
210 Storage device
220 Clock
230 Synchronous counter
240 Communication interface
250 Imager
300 Processor
301 Data acquirer
302 Display controller
310 Storage device
320 Input device
330 Display device
340 Communication interface
B1, B2, B3 Bus
DB Buffering data
DL Log
DM Moving image data
DP Control program

The invention claimed is:

1. A control system, comprising:
a camera including a first synchronous counter;
a programmable logic controller including a second synchronous counter; and
a control network connecting the camera and the programmable logic controller, the control network being configured to synchronize the first synchronous counter and the second synchronous counter by measuring durations of a plurality of transmission delays between the camera and the programmable logic controller, wherein
the camera adds, to a captured image obtained by image capturing, a count value of the first synchronous counter at the image capturing, and transmits the captured image to the programmable logic controller through the control network,
the programmable logic controller stores, into a storage device included in the programmable logic controller, a count value of the second synchronous counter, internal data or data of a control target, the count value of the first synchronous counter, and the captured image,
the programmable logic controller sends, to the camera, an instruction (i) including the count value of the second synchronous counter that is to occur at or after a longest communication delay duration of the control network and (ii) instructing the camera to be scheduled to perform the image capturing based on the count value of the second synchronous counter that is included in the instruction, and
the camera performs the image capturing at a timing indicated by the count value of the first synchronous counter corresponding to the count value of the second synchronous counter that is included in the instruction.

2. The control system according to claim 1, wherein the control system causes the camera to open a shutter such that an intermediate point of an exposure time of the camera matches an image capturing timing at which the camera is scheduled to perform the image capturing.

3. The control system according to claim 1, wherein the camera converts the count value of the first synchronous counter to a frame count value at a frequency different from a frequency of the first synchronous counter and transmits image data to the programmable logic controller together with the frame count value.

4. The control system according to claim 1, wherein, upon generation of a trigger with a condition specified by setting information, the programmable logic controller stores, into the storage device included in the programmable logic controller, control data and image data before and after the trigger with the condition specified by the setting information.

5. The control system according to claim 1, wherein
the camera is a plurality of the cameras, and
the programmable logic controller
sends, to the plurality of cameras, the instruction (i) including the count value of the second synchronous counter that is to occur at or after the longest communication delay duration of the control network and (ii) instructing to be scheduled to perform the image capturing based on the count value of the second synchronous counter that is included in the instruction, and
combines data of a plurality of the captured images received from the plurality of cameras and stores the combined data into the storage device.

6. The control system according to claim 1, wherein
the programmable logic controller
has a function for maintaining a constant scan time, and
sends, to the camera, the instruction (i) including the count value of the second synchronous counter that is to occur at or after the longest communication delay duration of the control network and at a timing for scanning performed by the programmable logic controller and (ii) instructing the camera to be scheduled to perform the image capturing based on the count value of the second synchronous counter that is included in the instruction.

7. A programmable logic controller connected with a control network, and a camera including a first synchronous counter, the programmable logic controller comprising:
a second synchronous counter; and
a storage device, wherein
the programmable logic controller receives a captured image that is obtained by image capturing and to which is added a count value, at the image capturing, of the first synchronous counter that is synchronized by the control network through measurement of a duration of a transmission delay between the camera and the programmable logic controller,
the programmable logic controller stores, into the storage device, a count value of the second synchronous counter that is synchronized by the control network through measurement of the duration of the transmission delay between the camera and the programmable logic controller, internal data or data of a control target, the count value of the first synchronous counter, and the captured image,
the programmable logic controller sends, to the camera, an instruction (i) including the count value of the second synchronous counter that is to occur at or after a longest communication delay duration of the control network and (ii) instructing the camera to be scheduled to perform the image capturing based on the count value of the second synchronous counter that is included in the instruction, and
the camera performs the image capturing at a timing indicated by the count value of the first synchronous counter corresponding to the count value of the second synchronous counter that is included in the instruction.

* * * * *